United States Patent [19]
Yoakum

[11] Patent Number: 5,963,132
[45] Date of Patent: Oct. 5, 1999

[54] ENCAPSULATED IMPLANTABLE TRANSPONDER

[75] Inventor: Jay Yoakum, Norco, Calif.

[73] Assignee: Avid Indentification Systems, Inc., Norco, Calif.

[21] Appl. No.: 08/729,566

[22] Filed: Oct. 11, 1996

[51] Int. Cl.[6] ................................................... G08B 13/14
[52] U.S. Cl. ...................... 340/572.1; 128/899; 257/784; 343/873
[58] Field of Search ..................... 340/572, 573; 455/100; 343/873; 257/701, 784; 235/449; 128/631, 899, 903; 606/117, 116

[56] References Cited

U.S. PATENT DOCUMENTS

| | | |
|---|---|---|
| 4,262,632 | 4/1981 | Hanton et al. . |
| 4,333,072 | 6/1982 | Beigel . |
| 5,025,550 | 6/1991 | Zirbes et al. . |
| 5,211,129 | 5/1993 | Taylor et al. . |
| 5,223,851 | 6/1993 | Hadden et al. . |
| 5,281,855 | 1/1994 | Hadden et al. . |
| 5,341,149 | 8/1994 | Valimaa et al. .......................... 343/873 |
| 5,482,008 | 1/1996 | Stafford et al. .......................... 128/899 |
| 5,572,410 | 11/1996 | Gustafson ................................ 257/784 |
| 5,634,432 | 6/1997 | O'Grady et al. ......................... 128/899 |

Primary Examiner—Daniel J. Wu
Assistant Examiner—John Tweel, Jr.
Attorney, Agent, or Firm—David B. Abel, Esq.; Graham & James LLP

[57] ABSTRACT

An EID or RFID transponder having an encapsulant with an open end to allow insertion of the transponder circuitry and a phase changing material such as an epoxy used to both secure the circuitry of the transponder within the encapsulant and seal the open end of the encapsulant.

17 Claims, 2 Drawing Sheets

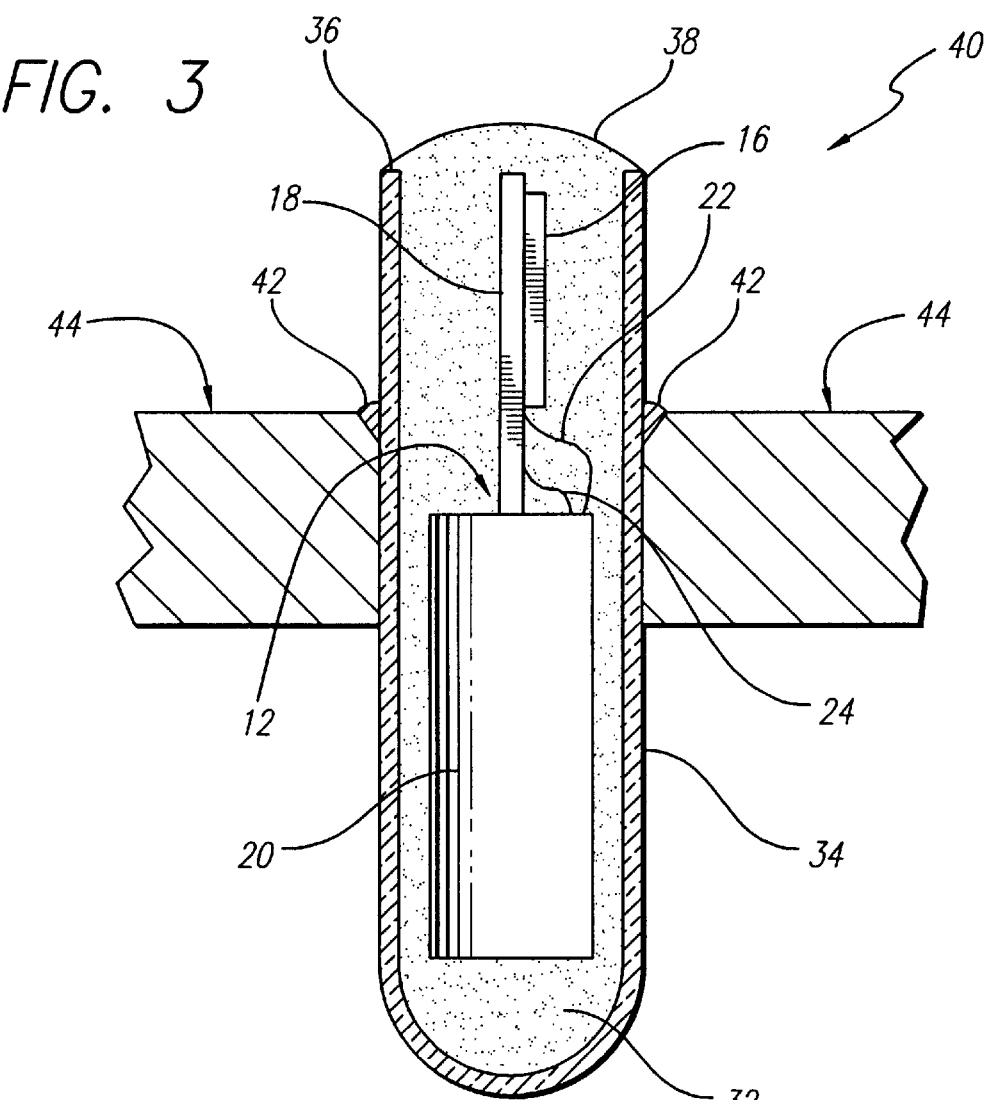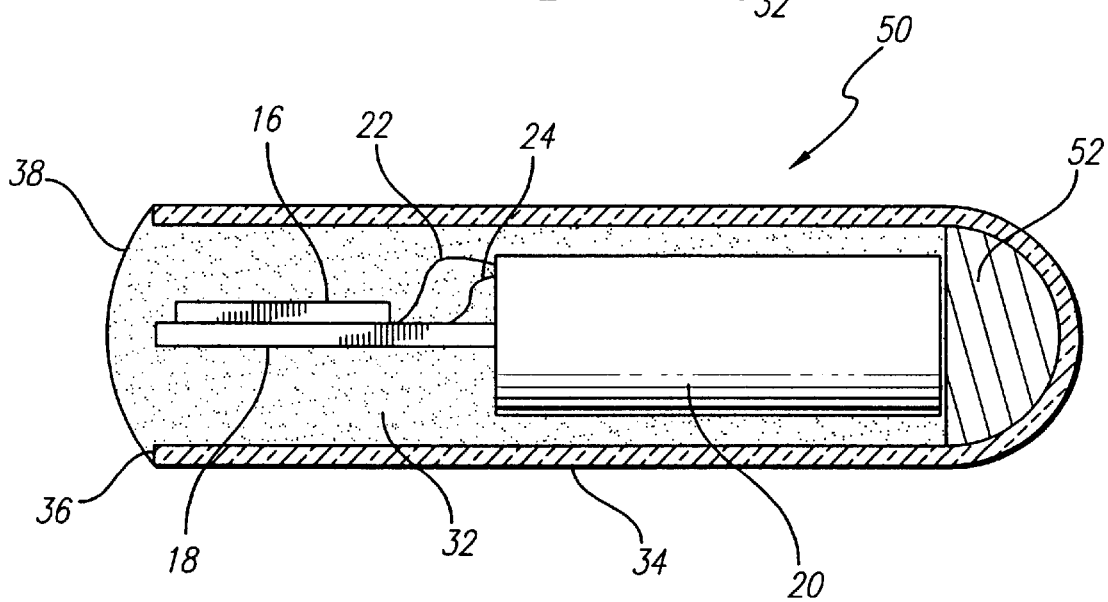

ENCAPSULATED IMPLANTABLE TRANSPONDER

FIELD OF THE INVENTION

The present invention relates to the field of electronic identification ("EID") systems, including radio frequency identification ("RFID") systems, and more particularly to the design and method of manufacturing a sealed encasement for the electronic circuitry of the transponder for such systems.

BACKGROUND OF THE INVENTION

EID and RFID systems which are the subject of the present invention include a signal emitter or reader which is capable of emitting a high frequency signal in the kilohertz (kHz) band range or an ultra-high frequency signal in the megahertz (MHz) band range. The emitted signal from the reader is received by a transponder which responds to or is activated in some manner upon detection or receipt of the signal from the reader.

Generally, the transponder for an EID system will include signal processing circuitry mounted on a printed circuit board which is attached to an antenna, such as a coil. The signal processing circuitry can include a number of different operational components as known in the art, though many operational components can be included in a single integrated circuit.

Certain types of "active" transponders may include a power source such as a battery which may also be attached to the circuit board. The battery is used to power the signal processing circuit during operation of the transponder. Other types of transponders such as "Half Duplex" ("HDX") transponders include an element for receiving energy from the reader such as a coil, and an element for storing energy, for example a capacitor. In an HDX system, when the signal from the reader is, turned off the capacitor discharges into the circuitry of the transponder to power the transponder so it can emit or generate a signal. The circuit designs for both active and HDX transponders are known in the art and therefore they are not described in detail herein.

Finally, a "Full Duplex" ("FDX") transponder generally does not include either a battery or an element for storing energy, instead energy is induced into the antenna or coil and used to power the signal processing circuitry of the transponder and generate the response concurrently with the emission of the emitted signal from the reader. FDX transponder circuits are also known in the art, an early example being disclosed in U.S. Pat. No. 4,333,072.

For each of the types of transponders presently in use, there is often a need for an application whereby the entire transponder must be encased in a sealed member so as to allow implantation into biological items to be identified, or for use in submerged or corrosive environments. Accordingly, various references, including U.S. Pat. Nos. 4,262,632; 5,025,550; 5,211,129; 5,223,851 and 5,281,855, disclose completely encapsulating the circuitry of various transponders within a ceramic, glass or plastic closed-ended cylinder.

For an encapsulated transponder, it is generally the practice to assemble the transponder circuitry and then insert the circuitry into a glass or plastic cylinder, one end of which is already sealed. The open end of the cylinder is then melted closed using a flame, to create an hermetically sealed encapsulant. However, the flame sealing of the encapsulant is a labor intensive, and therefore relatively expensive operational step in the construction of the transponder.

To prevent the circuitry from moving around inside of the glass encapsulant, it is also known to use a small amount of epoxy to bond the circuitry of the transponder to the interior surface of the glass encapsulant. A problem arises, however, in using epoxy to bond the circuitry of the transponder to a glass encapsulant. Due to the differences in manufacturing tolerances, it is difficult to determine exactly how much epoxy is needed in various applications. The displacement volume of the circuitry varies depending on the tolerance associated with the dimensions of the signal processing circuitry, circuit board and antenna or coil. In addition, the inside diameter of the glass encapsulant also changes due to variations in its tolerances.

In order to complete the sealing of the glass encapsulant, it is necessary to use an amount of epoxy which will leave a gas or air space above the top of the epoxy in order to assure complete hermetic sealing. As a result, the inside of the glass encapsulant is only partially filled with an epoxy and the circuitry of the transponder extends above the parting line between the top of the epoxy material and the entrapped gas or air. This creates a cantilever effect whereby the mass of the extending portion of the circuitry can oscillate, potentially disrupting the continuity of the electrical circuitry and breaking the delicate conductors on the circuit board or of the antenna or coil itself.

Accordingly, it would be beneficial to have a new encapsulant design for an EID or RFID transponder which eliminates costs and problems associated with flame sealing of an all glass encapsulant, and yet allows the transponder to be used in the implanted, submerged or corrosive environments for which it is intended.

SUMMARY OF THE INVENTION

The present invention contemplates an encapsulation of the circuitry of an EID or RFID transponder whereby a phase changing material such as an epoxy is used to both secure the circuitry of the transponder within an open ended encapsulant and seal the open end of the encapsulant. In addition, the epoxy may be used to form a ridge around the exterior surface of the encapsulant so that upon implantation or lodging within an item to be identified, the potential for migration of the transponder is reduced or eliminated.

BRIEF DESCRIPTION OF THE DRAWINGS

FIG. 3 depicts a cross sectional view of a second alternative embodiment for the transponder made according to the present invention; and FIG. 4 depicts a cross sectional view of a third alternative embodiment for the transponder made according to the present invention.

DETAILED DESCRIPTION OF THE PREFERRED EMBODIMENT

Figure 1:
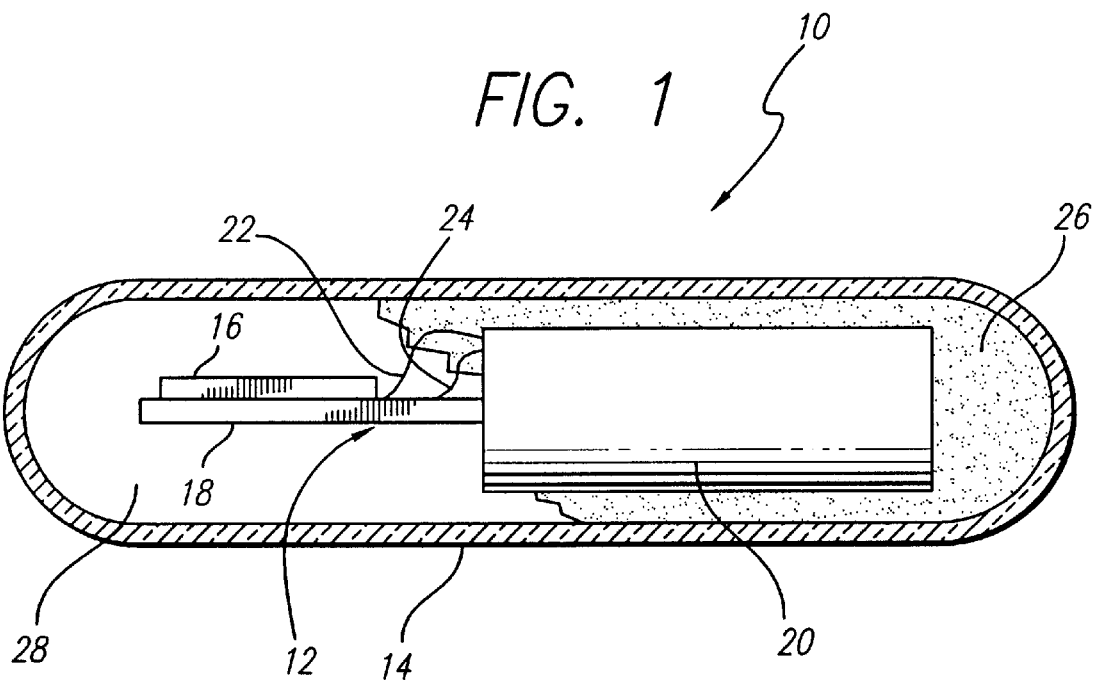
FIG. 1 depicts a cross sectional view of a transponder made according to the prior art.

FIG. 1 depicts a conventional transponder 10 including signal processing circuitry 12 encased in a sealed encapsulant 14. The signal processing circuitry 12 includes an integrated circuit 16, mounted to a circuit board 18. The integrated circuit 16 and circuit board 18 are interconnected to a antenna 20 depicted as a coil, via conductors 22 and 24. As shown, a portion of the encapsulant 14 is partially filled with an epoxy 26. The epoxy 26 bonds the antenna 20 and part of the signal processing circuitry 12 to one end of the interior of the sealed encapsulant 14. At the opposite end, however, there remains a gas or air space 28 inside of the sealed encapsulant 14.

The transponder 10 of FIG. 1 graphically depicts the problem of the circuit board 18 and the integrated circuit 16 cantilevered from the epoxy encased antenna 20, and the conductors 22 and 24 crossing between the epoxy 26 and the air gap 28. In this configuration, vibrations of the cantilevered portion of the circuit board 18 may eventually cause damage to the circuit board, as well as breakage of the conductors 22 and 24 either at the point of intersection between the gas 28 and epoxy 26 or at the connection to the circuit board 18.

Figure 2:
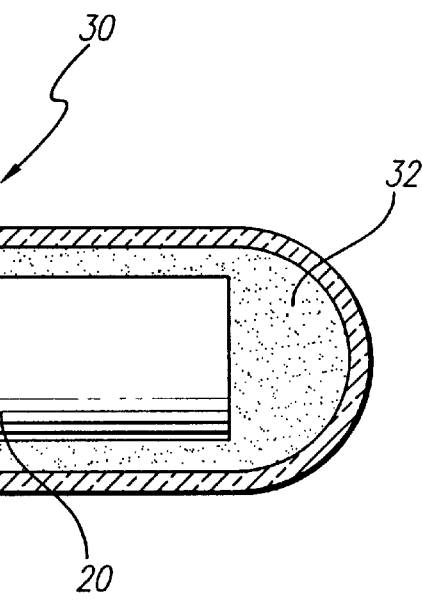
FIG. 2 depicts a cross sectional view of a first embodiment of the transponder according to the present invention.

A first embodiment of a transponder 30 of the present invention is depicted in FIG. 2. The transponder 30 includes the signal processing circuitry 12 including integrated circuit 16, mounted to a circuit board 18 and attached to the antenna 20 via conductors 22 and 24 as shown in FIG. 1 and described above. The signal processing circuitry 12 may be an active, Half Duplex or Full Duplex transponder circuit.

In FIG. 2, the signal processing circuitry 12 is depicted in an encapsulant 34, which is generally a cylinder one end of which is closed. The encapsulant also has an open end 36 which is sealed by completely filling the encapsulant 34 with a phase changing material such as an epoxy 32. Accordingly, the open end 36 of the encapsulant 34 is sealed by a top surface 38 of the epoxy 32. As depicted, the epoxy 32 fills up the entire interior volume of the encapsulant 34 which is not otherwise occupied by the transponder's signal processing circuitry 12 and the antenna 20, as well as any air bubbles which may be trapped during the assembly process.

In the embodiment of FIG. 2, the encapsulant 34 is preferably formed from glass or ceramic material, or alternatively from an appropriate plastic material, depending upon the intended application. However, for a transponder 30 intended for implantation applications, it may be preferable to use a glass material for the encapsulant 34, while the epoxy 32 is preferably a class 6 medical grade epoxy. An example of an appropriate epoxy is an epoxy designated as a "6030 MG" manufactured by CASCHEM Inc. of Bayonne, N.J. Preferably, the specific density of the signal processing circuitry 12 and antenna 20 assembly is greater than the specific density of the epoxy when it is in a liquid (pre-hardened) state. Thus the signal processing circuitry 12 can be assembled to the antenna 20, the encapsulant 34 can be placed in a fixture (as shown in FIG. 3) with the open end 36 directed upwardly, an appropriate amount of the phase changing material in a liquid phase can be placed into the encapsulant 34, and then the previously assembled signal processing circuitry 12 and antenna 20 is simply dropped into the encapsulant 34 to settle to a position near the closed end of the encapsulant 34, thereby displacing part of the still liquid phase changing material such as the epoxy 32. The phase changing material such as the epoxy 32 is then allowed to harden or it is cured to its solid phase, for example by the application of heat or fluorescent light. The epoxy 32 caps off or seals the open end 36 of the encapsulant 34, as depicted in FIG. 2.

One particular advantage of the present invention is that even if the encapsulant 34 is broken or cracked, the material of the encapsulant is still bonded to the epoxy 32 on its interior surface and therefore there is a much lower likelihood that a fragment would break off and separate from the transponder 20. Moreover, even if the encapsulant 34 does break, the entire signal processing circuit 12 and antenna 20 of the transponder 30 is still encased in the epoxy 32, whereby the transponder 30 can continue operation without degradation. Moreover, because all the electrical components of the transponder 30 are essentially frozen in the hardened epoxy 32, there is a much lower likelihood that vibrations or external shocks will cause breakage of the conductors 22 and 24, or other vibration or shock induced failures associated with prior art designs including the design according to FIG. 1.

FIG. 3 depicts another embodiment of a transponder 40 of the present invention, substantially in accordance with the description of transponder 30 of FIG. 2. Thus, like numbers and the description of the elements of FIG. 2 are incorporated by reference with respect to FIG. 3. In addition, however, FIG. 3 includes a ring or a ridge 42 formed of at least partially about an outer portion of the encapsulant 34. The ridge 42 is preferably formed from the same epoxy material which is use for the epoxy 32 which fills the encapsulant 34 and seals the top end of the encapsulant 34.

The ridge 42 is beneficial in preventing migration of the transponder 40 once it is placed in its intended environment, particularly in the event of implantation into a biological host. Formation of the ridge 42 preferably occurs by simply including enough of the liquid epoxy 32 so that it overruns the top of the encapsulant 34, down the outer wall and forms the ridge 42 at the top of a jig 44 used during assembly of the transponder 40.

FIG. 4 depicts another embodiment of a transponder 50 according to the present invention, substantially in accordance with the description of the transponder 20 of FIG. 2. Thus, like numbers and the description of the elements of the transponder 20 of FIG. 2 are incorporated by reference with respect to FIG. 4. In addition, the transponder 50 of FIG. 4 includes a weight 52 depicted in a location proximate the closed end of the encapsulant 34. As discussed for example in U.S. Pat. No. 4,262,632 (hereby incorporated by reference), studies show that a transponder or "bolus" suitable for placement in the reticulum of a ruminant animal such as a cow, will remain in the reticulum for an indefinite time if the specific gravity is two or greater and/or the total weight of the transponder exceeds sixty grams. Thus, the weight 52 is included so that the specific gravity is preferably two or greater, and the total weight of the transponder 50 preferably exceeds sixty grams.

Alternatively, the transponders of FIGS. 2 through 4 can be constructed of materials such that the specific gravity is greater than two and the total weight of the transponders is at least sixty grams, without the incorporation of the weight 52 depicted in FIG. 4. Further, for some applications it may be acceptable to use a transponder having a specific gravity between 1.7 and 2, or a total weight of between forty five and sixty grams. Such transponders may be retained in the reticulum, however permanent retention may not be provided.

It will be appreciated by those skilled in the art that, upon review of the foregoing description of the present invention, other alternatives and variations of the present invention will become apparent. Accordingly, the scope of the protection afforded is to be limited only by the appended claims.

I claim:

1. A transponder for an electronic identification system comprising:
    an antenna;
    a transponder circuit including a radio frequency identification signal processing circuit selected from the group consisting of active, half-duplex and full-duplex transponder circuits electrically interconnected to said antenna;

an encapsulant formed so as to have an open end to allow insertion of said transponder circuit and said antenna; and an epoxy bonding and sealing material to secure said transponder circuit and said antenna in said encapsulant and form a cap to seal said open end of said encapsulant.

2. The transponder of claim 1 further comprising a ridge of hardened epoxy formed on said encapsulant.

3. The transponder of claim 1 wherein said encapsulant is shaped in the form of a cylinder having a closed end.

4. The transponder of claim 1 wherein said encapsulant is formed from a material selected from the group consisting of glass, ceramic and plastic.

5. The transponder of claim 1 wherein said epoxy is a medical grade epoxy suitable for use on biological implants.

6. The transponder of claim 1 wherein said epoxy is a class six medical grade epoxy.

7. The transponder of claim 1 further comprising a weight element having a weight selected so that the total weight of the assembled transponder is at least forty five grams and the transponder has a specific gravity of at least 1.7.

8. The transponder of claim 1 further comprising a weight element having a weight selected so that the total weight of the assembled transponder is at least sixty grams.

9. The transponder of claim 1 wherein said transponder circuit is a half duplex circuit.

10. The transponder of claim 1 wherein said transponder circuit is a full duplex circuit.

11. The transponder of claim 1 wherein said transponder circuit includes a power source.

12. The transponder of claim 1 wherein said antenna is a coil.

13. A transponder for an electronic identification system comprising:

a transponder circuit selected from the group consisting of active, half duplex and full duplex electronic identification circuits;

an encapsulant having an open end to allow insertion of said transponder circuit; and a phase change material substantially filling said encapsulant when in a liquid phase and forming a cap which seals said open end of said encapsulant when in a solid phase.

14. The transponder of claim 13 wherein said phase change material is an epoxy.

15. The transponder of claim 14 wherein said epoxy is a medical grade epoxy suitable for use on biological implants.

16. The transponder of claim 14 wherein said epoxy is a class six medical grade epoxy.

17. A transponder for an electronic identification system comprising:

an antenna;

a transponder circuit including signal processing circuitry electrically interconnected to said antenna;

an encapsulant formed so as to have an open end to allow insertion of said transponder circuit and said antenna;

an epoxy bonding and sealing material to secure said transponder circuit and said antenna in said encapsulant and seal said open end of said encapsulant; and a ridge of hardened epoxy formed on an outer surface of said encapsulant so as to extend radially outward from said encapsulant.

* * * * *